(12) United States Patent
Fleming

(10) Patent No.: US 6,547,872 B1
(45) Date of Patent: Apr. 15, 2003

(54) SANDSTONE REFURBISHER AND SYNTHETIC WALL-SYSTEM ADHESIVE

(76) Inventor: Lloyd Jerome Fleming, P.O. Box 23441, St. Louis, MO (US) 63108

( * ) Notice: Subject to any disclaimer, the term of this patent is extended or adjusted under 35 U.S.C. 154(b) by 0 days.

(21) Appl. No.: 09/859,780

(22) Filed: Mar. 26, 2001

Related U.S. Application Data

(60) Provisional application No. 60/206,467, filed on May 22, 2000.

(51) Int. Cl.[7] ............................................... C04B 11/30
(52) U.S. Cl. ........................ 106/715; 106/724; 106/738; 106/778; 106/DIG. 2
(58) Field of Search ................................ 106/715, 724, 106/738, 778, DIG. 2

(56) References Cited

U.S. PATENT DOCUMENTS

| | | | | |
|---|---|---|---|---|
| 3,869,295 A | * | 3/1975 | Bowles et al. | |
| 4,043,826 A | * | 8/1977 | Hum | |
| 4,299,790 A | * | 11/1981 | Greenberg | |
| 4,362,566 A | * | 12/1982 | Hinterwaldner | |
| 5,730,797 A | * | 3/1998 | Parrish et al. | |
| 6,200,381 B1 | * | 3/2001 | Rechichi | 106/801 |

* cited by examiner

*Primary Examiner*—Paul Marcantoni

(57) ABSTRACT

A sandstone refurbishing compound is shown comprising a mixture of ordinary ingredients, namely a plaster/perlite mixture, portland cement, water, an acrylic resin, wood filling means, and silica sand. It can be used on existing sculptures, walls, or similar objects made of sandstone or similar materials.

2 Claims, No Drawings

SANDSTONE REFURBISHER AND SYNTHETIC WALL-SYSTEM ADHESIVE

This application claims the benefit of provisional patent application, serial No. 60/206,467 filed May 22, 2000.

BACKGROUND OF THE INVENTION

This invention relates generally to a sandstone refurbisher and wall system adhesive, and more particularly to one which can be used to match the surface of surrounding sandstone surfaces. It is an object of this invention to provide a novel compound that can be used to restore sandstone sculptures or walls, or other similar materials. It is a further object of the present invention to provide such a compound that can be used to visually blend in with the surrounding surface.

SUMMARY OF THE INVENTION

With the above objects in mind, the present invention combines several readily available household items to form a sandstone refurbisher. The compound of the present invention comprises a mixture of Gypsum Perlited Plaster Mix, Portland Cement II, water, sand, and an acrylic resin.

DETAILED DESCRIPTION OF THE PREFERRED EMBODIMENT

The compound of the present invention is formed by mixing several household items. The mixture starts with 2 pounds of plaster, preferably containing perlite additive, such as that manufactured as a mix by the Gypsum Supply Co. of Rockford, Ill. To the plaster mix, 8 ounces of Portland cement, such as that made by Bondex International, Inc. of St. Louis, Mo., is added. To the existing mixture, 4 ounces of acrylic resin is added, such as that manufactured by the Quikrete Compound of Atlanta, Ga. and known to those of ordinary skill in the art as acrylic resin #8610. Preferably, 16 ounces of wood filler means is added to the mixture. The inventor has found that Elmer's brand wood filler, manufactured by Elmer's Products, Inc. of Columbus, Inc., works well. Those of ordinary skill in the art can readily ascertain the approximate composition of this preferred wood filler from the manufacturer, which happens to be 5–10% magnesium carbonate (MgCO3) by weights; 30–50% limestone by weight; 1–5% of chlorite by weight; 1–5% of kaolin by weight; 1–5% of calcite (Ca(CO3)) by weight; 5–10% of talc by weight; and 0.1–0.99% of quartz (SiO2) by weight. 16 ounces of water is added to the existing mixture. It should be noted that these ingredients may be mixed in any quantity so long as the above ratios are adhered to, and it would be a simple matter to one of ordinary skill to mix the above compound in any quantity.

Lastly, ordinary silica sand is added. The exact mass (weight) of the sand to be added will vary depending upon the exact amounts of the aforementioned elements in the mixture, because the sand is added by volume ratio instead of weight ratio. The ratio of the volume of sand added to the volume of the remainder of the mixture should be 1.6:1. Optionally, color tinting may be added to match a desired color, such as the color of the existing surface being treated or refurbished.

The elements should be mixed quickly, and once mixed, should be applied quickly to the surface being treated or refurbished.

I claim:

1. A compound for applying to sandstone comprising:

plaster mix containing gypsum and perlite;

8 ounces of Portland cement for every 2 pounds of said plaster mix;

4 ounces of acrylic resin for every 2 pounds of said plaster mix;

16 ounces of water for every 2 pounds of said plaster mix; and sand, said sand being of a quantity such that the volume ratio of said sand to the combination of said plaster mix, said cement, said acrylic resin, and said water together is substantially 1.6:1.

2. The compound of claim 1, further comprising 16 ounces of wood filler for every 2 pounds of said plaster mix, said wood filler comprising 5–10% magnesium carbonate by weight, 30–50% limestone by weight; 1–5% chlorite by weight, 1–5% of kaolin by weight; 1–5% of calcite by weight, 5–10% of talc by weight, and 0.1–0.99% quartz by weight, and wherein the volume ratio of said sand to the combination of said plaster mix, said cement, said acrylic resin, said wood filler, and said water together is substantially 1.6:1.

* * * * *